United States Patent
Kim et al.

(10) Patent No.: US 8,624,841 B2
(45) Date of Patent: Jan. 7, 2014

(54) METHOD AND APPARATUS FOR DISPLAYING TOUCH SCREEN KEYBOARD

(75) Inventors: Bo-mi Kim, Yongin-si (KR); Bo-hyun Kyung, Yongin-si (KR); Myoung-soon Choi, Yongin-si (KR); Pil-seung Yang, Suwon-si (KR); Hark-joon Kim, Suwon-si (KR); Dae-hyun Kim, Suwon-si (KR); Sang-jun Han, Seoul (KR); Kuk-hyun Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 883 days.

(21) Appl. No.: 12/265,947

(22) Filed: Nov. 6, 2008

(65) Prior Publication Data
US 2009/0237359 A1    Sep. 24, 2009

(30) Foreign Application Priority Data
Mar. 24, 2008   (KR) .................. 10-2008-0027062

(51) Int. Cl.
*G06F 3/02*    (2006.01)

(52) U.S. Cl.
USPC .......................................................... 345/168

(58) Field of Classification Search
USPC .......................................................... 345/168
See application file for complete search history.

(56) References Cited

U.S. PATENT DOCUMENTS

2005/0122313 A1*   6/2005   Ashby ........................... 345/168

* cited by examiner

*Primary Examiner* — Amare Mengistu
*Assistant Examiner* — Joseph G Rodriguez
(74) *Attorney, Agent, or Firm* — Sughrue Mion, PLLC

(57) ABSTRACT

Provided are a method and apparatus for displaying various types of touch screen keyboards at various positions according to an information input condition of a user. The method includes recognizing a point on a touch screen which a reference finger of at least one hand of a user touches, and displaying a touch screen keyboard including keys arranged according to the recognized point. Accordingly, a user-based touch screen keyboard which can be easily used, allow information to be quickly input, and reduce touch error, can be provided.

9 Claims, 7 Drawing Sheets

METHOD AND APPARATUS FOR DISPLAYING TOUCH SCREEN KEYBOARD

CROSS-REFERENCE TO RELATED PATENT APPLICATION

This application claims priority from Korean Patent Application No. 10-2008-0027062, filed on Mar. 24, 2008, in the Korean Intellectual Property Office, the disclosure of which is incorporated herein in its entirety by reference.

BACKGROUND OF THE INVENTION

1. Field of the Invention

Methods and apparatuses consistent with the present invention relate to displaying a touch screen keyboard.

2. Description of the Related Art

In general, a touch screen is an input device replacing a traditional keyboard or a mouse. Touch screen keyboards are keyboards based on touch screens. Accordingly, when a user touches a key on a touch screen keyboard by using his/her finger or a touch pen, an apparatus having a touch screen function (referred to as a touch screen apparatus hereinafter) recognizes that a signal corresponding to the touched key is input.

Conventional touch screen keyboards are based on touch screen apparatuses. Accordingly, touch screen keyboards having display positions and display sizes designated according to touch screen apparatuses are provided to users. For example, when a touch screen apparatus has a large size, a touch screen keyboard including keys each having a large touch area may be displayed, and when a touch screen apparatus has a small size, a touch screen keyboard including keys each having a small touch area may be displayed.

As such, conventional touch screen keyboards are displayed at positions in sizes which are designated according to touch screen apparatuses, and have a similar key arrangement to that of conventional keyboards. Accordingly, when a user controls a touch screen keyboard by using his/her fingers, he/she should control the touch screen keyboard by using both his/her hands in a similar manner to that used to control a conventional keyboard.

Also, since touch areas for respective keys of the touch screen keyboard that is based on a touch screen apparatus are fixed, a touch error may be caused while using the user's fingers. For example, when the user touches a key by using his/her little finger, the little finger may fail to precisely touch a center point of a touch area of the key, thereby causing a touch error.

SUMMARY OF THE INVENTION

The present invention provides a method and apparatus for displaying a touch screen keyboard based on a user.

The present invention also provides a method and apparatus for displaying a touch screen keyboard, whereby various types of touch screen keyboards can be displayed at various positions according to an information input condition of a user.

According to an aspect of the present invention, there is provided a method of displaying a touch screen keyboard, the method comprising recognizing a point on a touch screen which a reference finger of at least one hand of a user touches, and displaying a touch screen keyboard comprising keys arranged according to the recognized point.

If the user's right hand is used, the reference finger is an index finger of the right hand, and if the user's left hand is used, the reference finger may be an index finger of the left hand.

The displaying of the touch screen keyboard may comprise displaying a first touch screen keyboard controlled by the right hand according to a first point on the touch screen which the index finger of the right hand touches; and displaying a second touch screen keyboard controlled by the left hand according to a second point on the touch screen which the index finger of the left hand touches.

If there exists a first key having a touch area whose center point is not controlled, each of the displaying of the first touch screen keyboard and the displaying of the second touch screen keyboard may comprise adjusting the center point of the touch area of the first key.

The adjusting of the center point of the touch area of the first key may comprise if it is determined that a real touch position of the first key is closer to a touch area of a second key which the reference finger controls than the center point of the touch area of the first key, moving the center point of the touch area of the first key to a position closer to the touch area of the second key, and if it is determined that the real touch position of the first key is farther from the touch area of the second key than the center point of the touch area of the first key, enlarging a display area of the first key.

The adjusting of the center point of the touch area of the first key may comprise if it is determined that a real touch position of the first key is closer to a touch area of a second key which the reference finger controls than the center point of the touch area of the first key, moving the center point of the touch area of the first key to a position closer to the touch area of the second key, and if it is determined that the real touch position of the first key is farther from the touch area of the second key than the center point of the touch area of the first key, separating a display area of the first key from displays areas of other keys and moving the separated display area of the first key.

The first touch screen keyboard and the second touch screen keyboard may be displayed by overlapping one or more keys. The recognizing of the point may be performed by using a puck.

The changing of the displayed touch screen keyboard may comprise if the finger is moved on the basis of the puck, displaying the touch screen keyboard so as to emphasize an upper key row above a reference key row, and if the finger is moved downward on the basis of the puck, displaying the touch screen keyboard so as to emphasize a lower key row below the reference key row.

The changing of the displayed touch screen keyboard may comprise if the finger is not moved on the basis of the puck, displaying the touch screen keyboard so as to emphasize the reference key row.

The method may further comprise checking a distance between the first point and the second point, and when it is determined that the distance is less than a predetermined distance, reducing the display size of each of the first touch screen keyboard and the second touch screen keyboard.

According to another aspect of the present invention, there is provided an apparatus for displaying a touch screen keyboard, the apparatus comprising a display unit which displays a touch screen keyboard, a touch screen which recognizes a point that a user's finger touches, a storage unit which stores touch screen keyboard information, and a control unit which displays the touch screen keyboard information read from the storage unit at a position on the display unit which is determined according to a point of a reference finger of at least one hand of the user which is recognized by the touch screen.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF EXEMPLARY EMBODIMENTS OF THE INVENTION

According to exemplary embodiments of the present invention, there is provided a method and apparatus for displaying various types of touch screen keyboards based on a user by varying the display position of a first touch screen keyboard including keys controlled by a user's right hand and a second touch screen keyboard including keys controlled by the user's left hand on the basis of a point of a touch screen which is recognized by an element, such as an index finger of each hand or a puck, adjusting a center point of a touch area if necessary, changing a displayed touch screen keyboard according to the movement of a finger, and reducing the sizes of the first touch screen keyboard and the second touch screen keyboard according to a detected relation between reference points.

Additionally, exemplary embodiments of the present invention provide a method and apparatus for displaying a user-based touch screen keyboard on the basis of an element, such as an index finger of a hand or a puck corresponding to the index finger of the hand.

The present invention will now be described more fully with reference to the accompanying drawings, in which exemplary embodiments of the invention are shown.

Figure 1:
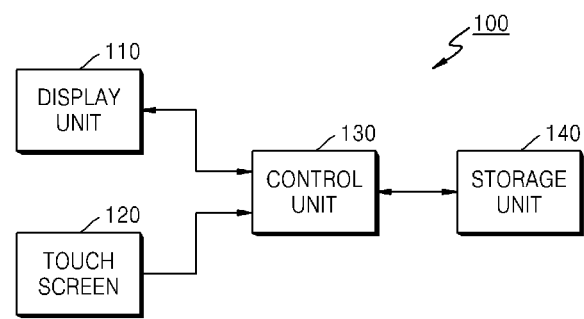
FIG. 1 is a block diagram of an apparatus for displaying a touch screen keyboard, according to an exemplary embodiment of the present invention.

FIG. 1 is a block diagram of an apparatus 100 for displaying a touch screen keyboard, according to an exemplary embodiment of the present invention. The apparatus 100 may be any electronic device having a touch screen function. Referring to FIG. 1, the apparatus 100 includes a display unit 110, a touch screen 120, a control unit 130, and a storage unit 140.

The display unit 110 displays a touch screen keyboard. The display unit 110 may be a liquid crystal display (LCD). The touch screen keyboard displayed on the display unit 110 may be one of a plurality of application programs which can be executed in the apparatus 100. The display unit 110 may display not only the touch screen keyboard, but also other application programs. The display unit 110 may display the touch screen keyboard while displaying other application programs. The touch screen keyboard is displayed on the display unit 110 when the apparatus 110 is set to a touch screen keyboard display mode.

The touch screen 120 recognizes a point (or location) on the touch screen 120 which a user's finger touches. To this end, the touch screen 120 may be configured to sense a pressure applied thereto. For example, the touch screen 120 may be configured to have sensor lines reacting to a pressure, sensors located around an electrically charged surface, or touch sensors. The touch screen 120 converts the recognized touch into a point signal and outputs the point signal to the control unit 130.

The control unit 130 drives an application program of the apparatus 100 according to the point signal received from the touch screen 120, and displays necessary information on the display unit 110. In particular, when the control unit 130 receives a point signal of a reference finger of one or both hands of the user from the touch screen 120, the control unit 130 displays touch screen keyboard information, read from the storage unit 140, at a position on the display unit 110 which is determined by the received point signal.

To this end, the control unit 130 may include a functional unit (not shown) receiving the point signal (or information) output from the touch screen 120, a functional unit (not shown) analyzing the received information, and a functional unit (not shown) operating the apparatus 100 according to the analysis result. The functional unit receiving the point signal may be defined as an input/output control unit for the touch screen 120. The apparatus 100 may be configured so that the functional unit receiving the point signal is not included in the control unit 130 but is disposed between the control unit 130 and the touch screen 120.

The control unit 130 may receive only a point signal of a reference point of the right hand, receive only a point signal of a reference finger of the left hand, or receive point signals of reference fingers of the right and left hands.

When the right hand is used, the reference finger may be an index finger of the right hand. When the left hand is used, the reference finger may be an index finger of the left hand.

The control unit 130 may display on the display unit 110 a first touch screen keyboard controlled by the right hand on the basis of a first point on the touch screen 120 which the index finger of the right hand touches, and display on the display unit 110 a second touch screen keyboard controlled by the left hand on the basis of a second point on the touch screen 120 which the index finger of the left hand touches.

Figure 2A:
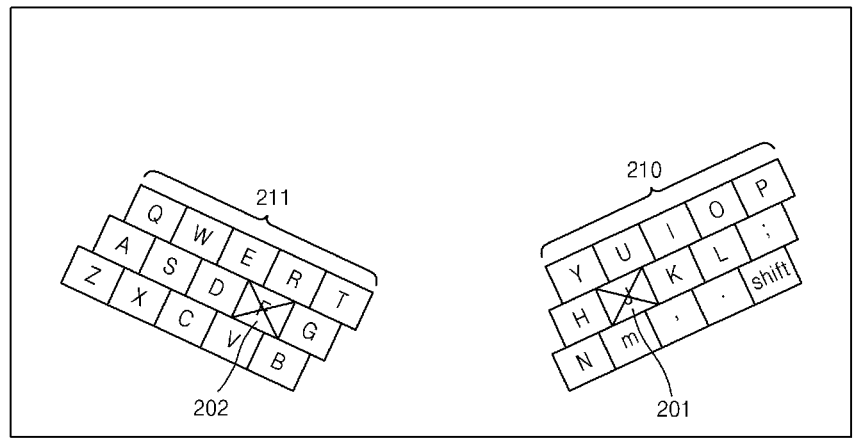
FIGS. 2A and 2B illustrate touch screen keyboards displayed on a display unit of the apparatus of FIG. 1, according to an exemplary embodiment of the present invention.
Figure 2B:
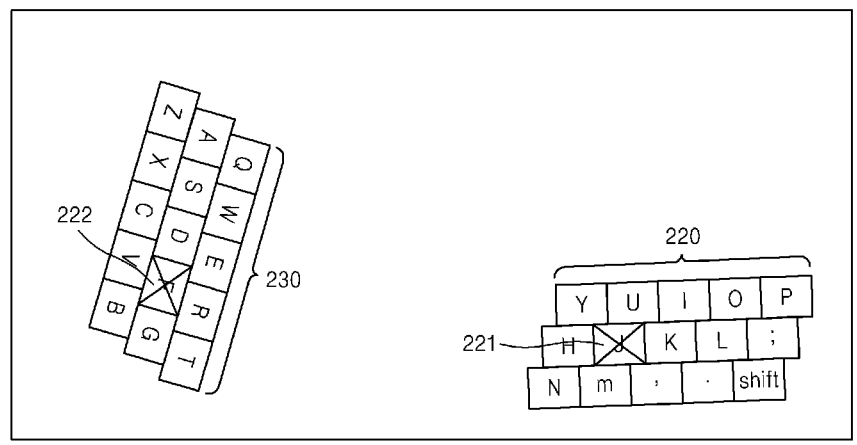

FIGS. 2A and 2B illustrate touch screen keyboards displayed on the display unit 110 of the apparatus 100 of FIG. 1, according to an exemplary embodiment of the present invention.

In FIG. 2A, reference numeral 201 denotes a first point, and reference numeral 210 denotes a first touch screen keyboard. Accordingly, the first touch screen keyboard 210 is the touch screen keyboard controlled by the user's right hand. In FIG. 2A, reference numeral 202 denotes a second point, and reference numeral 211 denotes a second touch screen keyboard. Accordingly, the second touch screen keyboard 211 is the touch screen keyboard controlled by the user's left hand. FIG. 2A illustrates a touch screen keyboard displayed when the index finger of the right hand of the user touches a center point of a key corresponding to the first point 201 and the index finger of the left hand of the user touches a center point of a key corresponding to the second point 202.

FIG. 2B illustrates a touch screen keyboard displayed when a first point 221 is recognized and a second point 222 is recognized.

Referring to FIGS. 2A and 2B, the display position of a touch screen keyboard may be varied according to a point on the touch screen 110 which a reference finger of one hand or both hands of the user touches, and the touch screen keyboard may be displayed after being divided into a first touch screen keyboard including keys controlled by the right hand and a second touch screen keyboard including keys controlled by the left hand.

Although each of the first touch screen keyboard and the second touch screen keyboard includes keys arranged in a matrix of 3 rows by 5 columns in FIGS. 2A and 2B, the keys included in each of the first touch screen keyboard and the second touch screen keyboard may be arranged in a matrix of at least 1 row by at least 2 columns.

When there exists at least one first key having a touch area whose center point is not controlled among keys included in the first touch screen keyboard and the second touch screen keyboard, the control unit 130 may adjust the center point of the touch area of the first key.

Figure 3A:
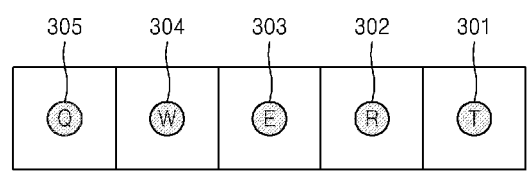
FIGS. 3A through 3E illustrate original center points and changed center points of keys, according to an exemplary embodiment of the present invention.
Figure 3B:
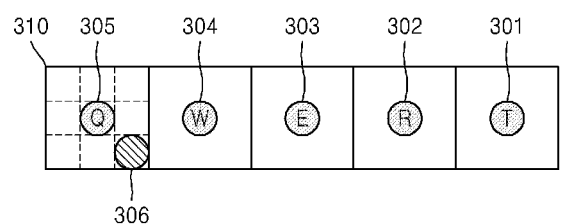

FIGS. 3A through 3E illustrate original center points and changed center points of keys, according to an exemplary embodiment of the present invention. When keys T, R, E, W, and Q included in a touch screen keyboard displayed on the display unit 110 respectively have original center points 301, 302, 303, 304, and 305, and a touch on the center point 305 of the key Q is not recognized, the control unit 130 divides a touch area 310 of the key Q into 9 areas as shown in FIG. 3B, and counts the number of touches on each divided area for a predetermined period of time. When it is determined that the number of touches on an area 306 is the highest among the 9 areas, the control unit 130 judges that the area 306 among the divided areas of the touch area 310 of the key Q is a real touch area that the user often touches, and changes the area 306 to a center point of the key Q in order to operate the touch screen keyboard.

Although the touch area 310 is divided into 9 areas in FIG. 3B, the present invention is not limited thereto, and the touch area 310 may be divided into n areas where n is an integer greater than 2. The fact that the touch on the center point 305 of the key Q is not recognized means that the key Q is controlled by the user but a value recognized by the touch on the key Q on the touch screen 110 is less than a predetermined threshold value. The predetermined period of time may be set in advance.

Figure 3C:
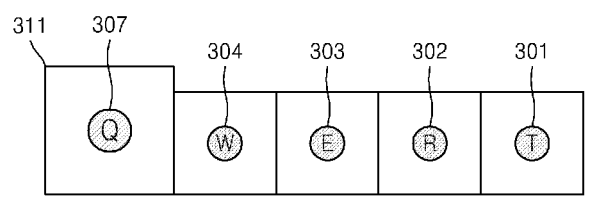

FIG. 3C illustrates that, when it is determined that the touch on the center point 305 of the key Q is not recognized, the touch area 310 of the key Q is enlarged to an area 311 by the control unit 130. Accordingly, the center point 305 of the key Q is enlarged to a point 307 as shown in FIG. 3C.

Figure 3D:
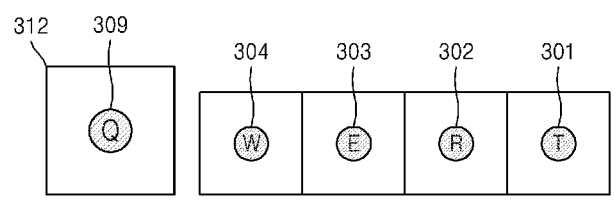

FIG. 3D illustrates that, when it is determined that the touch on the center point 305 of the key Q is not recognized, the touch area 310 of the key Q is separated from touch areas of the other keys and then enlarged to an area 312 by the control unit 130. That is, the touch area 310 of the key Q is separated from the touch areas of the other keys W, E, R, and T and then enlarged to the touch area 312. The other keys and the key Q may constitute one group. Accordingly, the center point 305 of the touch area 310 of the key Q is enlarged to a point 309, such that the position of the center point 305 is changed.

Figure 3E:
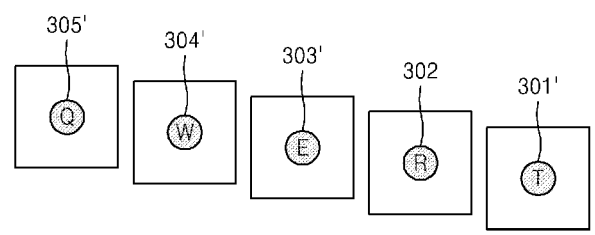

FIG. 3E illustrate that, when it is determined that touches on the center points 301, 303, 304, and 305 of the keys T, E, W, and Q, respectively, are not recognized, the touch areas of the keys T, E, W, and Q are separated from the touch area of the key R by the control unit 130 such that the center points 301, 303, 304, and 305 of the keys T, E, W, and Q are changed to 301', 303', 304', and 305', respectively.

It can be seen from FIGS. 3A through 3E that, when there exists at least one first key whose center point is not controlled but whose touch area is controlled on the touch screen keyboard displayed on the display unit 110, if it is determined that a real touch position of the first key is closer to a touch area of a second key that is controlled by the reference finger than the center point of the touch area of the first key, the control unit 130 may adjust the center point of the first key to move the center point of the touch area of the first key to a position closer to the touch area of the second key as shown in FIG. 3B. In FIG. 3B, the key Q corresponds to the first key and the key R corresponds to the second key.

When it is determined that the real touch position of the first key is farther away from the touch area of the second key than the center point of the touch area of the first key, the control unit 130 may adjust the center point by enlarging a display area of the first key as shown in FIG. 3C.

When it is determined that the real touch position of the first key is farther away from the touch area of the second key than the center point of the touch area of the first key, the control unit 130 may adjust the center point by separating the display area of the first key from display areas of other keys and moving the display area of the first key as shown in FIG. 3D.

Also, the control unit 130 may display the first touch screen keyboard and the second touch screen keyboard in such a manner that one or more keys are overlapped on the basis of touch screen keyboard information stored in the storage unit 140. That is, when the first and second touch screen keyboards having no overlapped keys as shown in FIGS. 2A and 2B are stored in the storage unit 140, the control unit 130 reads this information from the storage unit 140 and displays the information on the display unit 110. However, when the first and second touch screen keyboards having one or more overlapped keys as shown in FIGS. 4A and 4B are stored in the storage unit 140, the control unit 130 may display the first and second touch screen keyboards having the one or more overlapped keys on the display unit 110.

Figure 4A:
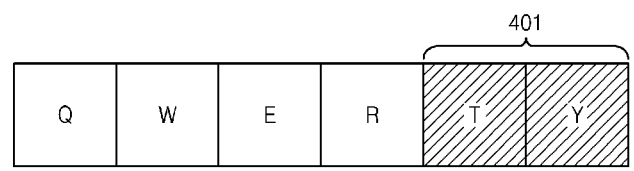
FIGS. 4A and 4B illustrate a touch screen keyboard including overlapped keys, according to an exemplary embodiment of the present invention.
Figure 4B:
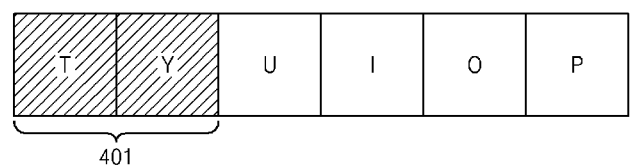

FIG. 4A illustrates one row of keys that are controlled by the left hand, according to an exemplary embodiment of the present invention. FIG. 4B illustrates one row of keys that are controlled by the right hand, according to an exemplary embodiment of the present invention. Keys T and Y among the keys are overlapped in a touch area 401.

Figure 5:
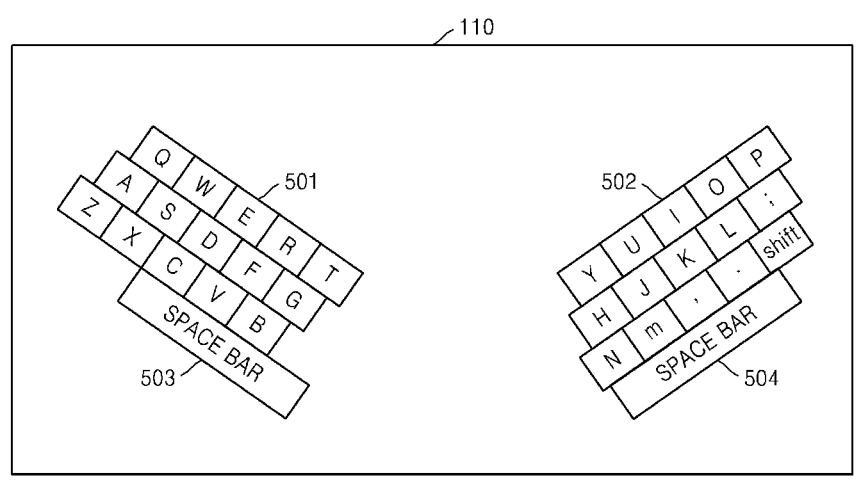
FIG. 5 illustrates a touch screen keyboard including overlapped keys, according to an exemplary embodiment of the present invention.

FIG. 5 illustrates a touch screen keyboard on the display unit 110, including overlapped space bars, according to an exemplary embodiment of the present invention. In FIG. 5, reference numeral 501 denotes a touch screen keyboard controlled by the user's left hand, and reference numeral 502 denotes a touch screen keyboard controlled by the user's right hand. Space bar keys 503 and 504 of the touch screen keyboards 501 and 502, respectively, are overlapped because the space bar keys 503 and 504 can be pressed with either hand. Accordingly, the overlapped keys may be determined based on whether they can be pressed with either hand.

The storage unit 140 stores touch screen keyboard information on each of the first touch screen keyboard and the second touch screen keyboard. The storage unit 140 may store first touch screen keyboard information and second touch screen keyboard information so as to support all or any one of such types as shown in FIGS. 2 through 5 according to the user's selection.

Figure 6:
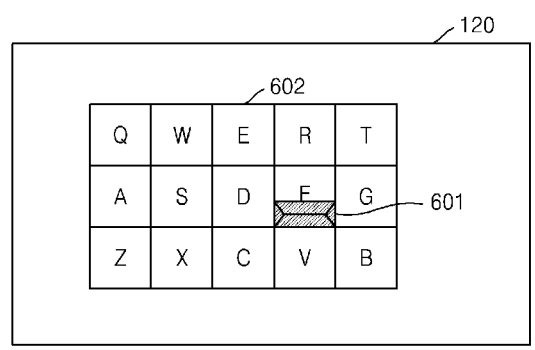
FIG. 6 illustrates a touch screen keyboard based on a reference point using a puck, according to an exemplary embodiment of the present invention.

FIG. 6 illustrates a touch screen keyboard 602 on the touch screen 120 based on a reference point using a puck 601, according to an exemplary embodiment of the present invention. Referring to FIG. 6, since the puck 601 is located on the touch screen 120, the same effect as if the reference finger of one or both hands touches the touch screen 120 can be achieved. That is, the puck 601 in FIG. 6 may perform the same function as that of the index finger of the left hand of the user. When the puck 601 is located on the touch screen 120, the control unit 130 displays the touch screen keyboard 602 including keys arranged in a matrix of 3 rows by 5 columns, which are controlled by the user's left hand, on the display unit 110. When two pucks are located on the touch screen 120, two touch screen keyboards may be displayed on the display unit 110 as shown in FIG. 2A. Whether the puck 601 located on the touch screen 120 corresponds to the index finger of the right hand or to the index finger of the left hand may be determined by considering the entire area of the touch screen 120 and the position of the puck 601 on the touch screen 120.

When the apparatus 100 is configured so that the puck 601 of FIG. 6 detects the movement of the finger of the user and the touch screen 120 recognizes the detection result, the control unit 130 may change a touch screen keyboard displayed on the display unit 110 on the basis of a signal corresponding to the movement of the finger of the user which is transmitted from the touch screen 120.

Figure 7:
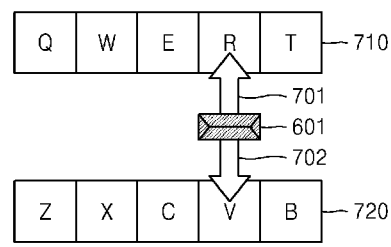
FIG. 7 is a diagram for explaining a method of changing a displayed touch screen keyboard as a user's finger is moved, according to an exemplary embodiment of the present invention.

FIG. 7 is a diagram for explaining a method of changing a displayed touch screen keyboard as the user's finger is moved, according to an exemplary embodiment of the present invention. Referring to FIG. 7, when the touch screen 120 recognizes in operation 701 that his/her finger is moved upward on the basis of the puck 601, the control unit 130 may display the touch screen keyboard so as to emphasize an upper key row 710 above a reference key row. The emphasis may be performed by making a touch area of the upper key row 710 larger than a touch area of the reference key row or making the color of the touch area of the upper key row 710 different from that of the touch area of the reference key row.

When the touch screen 120 recognizes in operation 702 that his/her finger is moved downward on the basis of the puck, the control unit 130 may display the touch screen keyboard so as to emphasize a lower key row 720 below the reference key row.

Figure 8A:
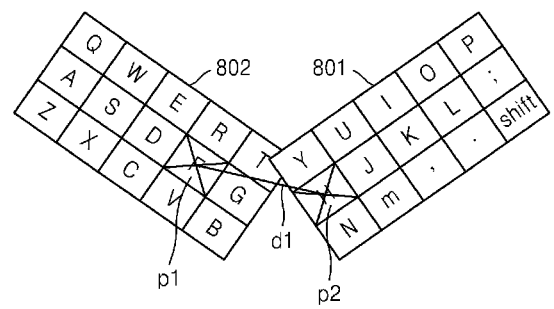
FIGS. 8A and 8B illustrate a touch screen keyboard adjusted based on a distance between two reference points, according to an exemplary embodiment of the present invention.
Figure 8B:
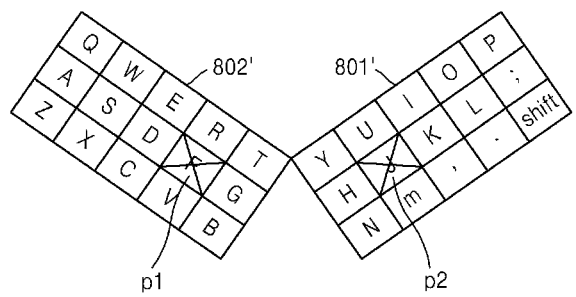

Also, the control unit 130 checks a distance between a first point and a second point. The first point and the second point are similar to those described with reference to FIG. 1. When it is determined that the distance is less than a predetermined distance, the control unit 130 may reduce the display size of each of the first touch screen keyboard and the second touch screen keyboard and display the reduced first touch screen keyboard and the reduced second touch screen keyboard on the display unit 110. FIGS. 8A and 8B illustrate a touch screen keyboard adjusted based on a distance between two reference points, according to an exemplary embodiment of the present invention. Referring to FIG. 8A, when a distance d1 between a first point p1 and a second point p2 is less than a predetermined distance, a first touch screen keyboard 801 and a second touch screen keyboard 802 of FIG. 8A may be reduced in size to a first touch screen keyboard 801' and a second touch screen keyboard 802' of FIG. 8B and the reduced first touch screen keyboard 801' and the reduced second touch screen keyboard 802' may be displayed. Whether the distance is less than the predetermined distance may be determined by considering whether the first touch screen keyboard 801 and the second touch screen keyboard 802 are overlaid on the touch screen 120.

Figure 9:
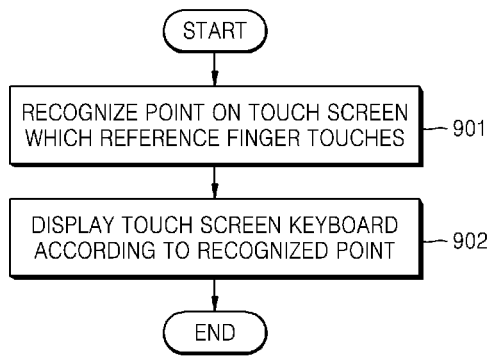
FIG. 9 is a flowchart illustrating a method of displaying a touch screen keyboard, according to an exemplary embodiment of the present invention.

FIG. 9 is a flowchart illustrating a method of displaying a touch screen keyboard, according to an exemplary embodiment of the present invention.

In operation 901, a point on a touch screen which a reference finger of one or both hands of a user touches is recognized. When the user's right hand is used, the reference finger may be an index finger of the right hand. When the user's left hand is used, the reference finger may be an index finger of the left hand.

In operation 902, a touch screen keyboard including keys arranged according to the recognized point is displayed. Operation 902 may include displaying a first touch screen keyboard controlled by the right hand according to a first point on the touch screen which the index finger of the right hand touches and displaying a second touch screen keyboard controlled by the left hand according to a second point on the touch screen which the index finger of the left hand touches.

When there exists a first key having a touch area whose center point is not controlled, the displaying of the first touch screen keyboard and the displaying of the second touch screen keyboard may include adjusting the center point of the touch area of the first key.

The adjusting of the center point of the touch area of the first key may include, when it is determined that a real touch position of the first key is closer to a touch area of a second key controlled by the reference finger than the center point of the touch area of the first key is, moving the center point of the touch area of the first key to a position closer to the touch area of the second key, and when it is determined that the real touch position of the first key is farther away from the touch area of the second than the center point of the touch area of the first key is, enlarging a display area of the first key.

Alternatively, the adjusting of the center point of the touch area of the first key may include, when the real touch position of the first key is closer to the touch area of the second key controlled by the reference finger than the center point of the touch area of the first key is, moving the center point of the touch area of the first key to a position closer to the touch area of the second key, and when it is determined that the real touch position of the first key is farther away from the touch area of the second key than the center point of the touch area of the first key is, separating the display area of the first key from display areas of other keys and moving the separated display area of the first key.

The first touch screen keyboard and the second touch screen keyboard may be displayed by overlapping one or more keys as described above with reference to FIGS. 4A and 4B.

Operation 902 may include checking a distance between the first point and the second point and, when it is determined that the distance is less than a predetermined distance, reducing the display size of each of the first touch screen keyboard and the second touch screen keyboard. The first point, the second point, the first touch screen keyboard, and the second touch screen keyboard are similar to those as described with reference to FIG. 1.

Operation 901 may include recognizing the point by using a puck as described with reference to FIG. 6. In this case, operation 902 may include checking the movement of the finger of the user on the basis of the puck, and changing a displayed touch screen keyboard displayed according to the checking result. That is, when the finger is moved upward on the basis of the puck as described with reference to FIG. 7, the touch screen keyboard may be displayed so as to emphasize an upper key row above a reference key row, when the finger is moved downward on the basis of the puck, the touch screen keyboard is displayed so as to emphasize a lower key row below the reference key row, and when the finger is not moved on the basis of the puck, the touch screen keyboard may be displayed so as to emphasize the reference key row.

The present invention may be embodied as computer-readable codes on a computer-readable recording medium. The computer-readable recording medium is any data storage device that can store data which can be thereafter read by a computer system. Examples of the computer-readable recording medium include read-only memories (ROMs), random-access memories (RAMs), CD-ROMs, magnetic tapes, floppy disks, and optical data storage devices. The computer-readable recording medium can also be distributed over network coupled computer systems so that the compute readable code is stored and executed in a distributed fashion. Additionally, the present invention may be embodied as a computer-readable transmission medium. The computer-readable transmission medium may be carrier waves (such as data transmission through the Internet).

As described above, since various types of touch screen keyboards can be displayed at various positions according to an information input condition of a user, e.g., the position of an index finger of the user, a user-customized touch screen keyboard (or a user-based touch screen keyboard), which can be easily used, allow information to be quickly input, and reduce touch error, can be provided.

While the present invention has been particularly shown and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. A method of displaying a touch screen keyboard, the method comprising:
   recognizing a point on a touch screen which a reference finger of at least one hand of a user touches; and
   displaying a touch screen keyboard comprising keys arranged according to the recognized point,
   wherein, when the user's right hand is used, the reference finger is an index finger of the right hand, and when the user's left hand is used, the reference finger is an index finger of the left hand,
   wherein the displaying of the touch screen keyboard comprises:
   displaying a first touch screen keyboard controlled by the right hand according to a first point on the touch screen which the index finger of the right hand touches; and
   displaying a second touch screen keyboard controlled by the left hand according to a second point on the touch screen which the index finger of the left hand touches;
   wherein, when there exists a first key having a touch area whose center point is not controlled, each of the displaying of the first touch screen keyboard and the displaying of the second touch screen keyboard comprises adjusting the center point of the touch area of the first key,
   wherein the adjusting of the center point of the touch area of the first key comprises:
   when it is determined that a real touch position of the first key is closer to a touch area of a second key which the reference finger controls than the center point of the touch area of the first key, moving the center point of the touch area of the first key to a position closer to the touch area of the second key; and
   when it is determined that the real touch position of the first key is farther from the touch area of the second key than the center point of the touch area of the first key, enlarging a display area of the first key.

2. The method of claim 1, wherein the adjusting of the center point of the touch area of the first key comprises:
   when it is determined that a real touch position of the first key is closer to a touch area of a second key which the reference finger controls than the center point of the touch area of the first key, moving the center point of the touch area of the first key to a position closer to the touch area of the second key; and
   when it is determined that the real touch position of the first key is farther from the touch area of the second key than the center point of the touch area of the first key, separating a display area of the first key from displays areas of other keys and moving the separated display area of the first key.

3. A method of displaying a touch screen keyboard, the method comprising:
   recognizing a point on a touch screen which a reference finger of at least one hand of a user touches; and
   displaying a touch screen keyboard comprising keys arranged according to the recognized point, wherein the recognizing of the point is performed by using a puck,
   wherein the displaying of the touch screen keyboard comprises:
   checking the movement of the finger of the user on the basis of the puck; and
   changing the displayed touch screen keyboard according to the checking result
   wherein the changing of the displayed touch screen keyboard comprises:
   when the finger is moved upward on the basis of the puck, displaying the touch screen keyboard so as to emphasize an upper key row above a reference key row; and
   when the finger is moved downward on the basis of the puck, displaying the touch screen keyboard so as to emphasize a lower key row below the reference key row.

4. The method of claim 3, wherein the changing of the displayed touch screen keyboard comprises:
   when the finger is not moved on the basis of the puck, displaying the touch screen keyboard so as to emphasize the reference key row.

5. A method of displaying a touch screen keyboard, the method comprising:
   recognizing a point on a touch screen which a reference finger of at least one hand of a user touches; and
   displaying a touch screen keyboard comprising keys arranged according to the recognized point,
   wherein, when the user's right hand is used, the reference finger is an index finger of the right hand, and when the user's left hand is used, the reference finger is an index finger of the left hand,
   wherein the displaying of the touch screen keyboard comprises:

displaying a first touch screen keyboard controlled by the right hand according to a first point on the touch screen which the index finger of the right hand touches;

displaying a second touch screen keyboard controlled by the left hand according to a second point on the touch screen which the index finger of the left hand touches, checking a distance between the first point and the second point; and when it is determined that the distance is less than a predetermined distance, reducing the display size of each of the first touch screen keyboard and the second touch screen keyboard.

6. An apparatus for displaying a touch screen keyboard, the apparatus comprising:

a display unit which displays a touch screen keyboard;

a touch screen which recognizes a point that a user's finger touches;

a storage unit which stores touch screen keyboard information; and a control unit which displays the touch screen keyboard information read from the storage unit at a position on the display unit which is determined according to a point of a reference finger of one or both hands of the user which is recognized by the touch screen, wherein, when the user's right hand is used, the reference finger is an index finger of the right hand, and when the user's left hand is used, the reference finger is an index finger of the left hand, wherein the control unit displays on the display unit a first touch screen keyboard controlled by the right hand according to a first point on the touch screen which the index finger of the right hand touches, and displays on the display unit a second touch screen keyboard controlled by the left hand according to a second point on the touch screen which the index finger of the left hand touches, wherein the control unit checks a distance between the first point and the second point, and when it is determined that the distance is less than a predetermined distance, reduces the display size of each of the first touch screen keyboard and the second touch screen keyboard and displays the reduced first touch screen keyboard and the reduced second touch screen keyboard on the display unit.

7. The apparatus of claim 6, wherein, when there exists at least one first key having a touch area whose center point is not controlled among keys included in the first touch screen keyboard and the second touch screen keyboard, the control unit adjusts the center point of the touch area of the first key.

8. An apparatus for displaying a touch screen keyboard, the apparatus comprising:

a display unit which displays a touch screen keyboard;

a touch screen which recognizes a point that a user's finger touches;

a storage unit which stores touch screen keyboard information; and a control unit which displays the touch screen keyboard information read from the storage unit at a position on the display unit which is determined according to a point of a reference finger of one or both hands of the user which is recognized by the touch screen, wherein the touch screen recognizes the point using a puck located on the touch screen wherein the touch screen detects movement of a finger of the user on the basis of the puck and outputs a signal corresponding to the movement of the finger, wherein the control unit changes the touch screen keyboard displayed on the display unit according to the signal corresponding to the movement of the finger, wherein the changing of the displayed touch screen keyboard comprises:

when the finger is moved upward on the basis of the puck, displaying the touch screen keyboard so as to emphasize an upper key row above a reference key row; and when the finger is moved downward on the basis of the puck, displaying the touch screen keyboard so as to emphasize a lower key row below the reference key row.

9. The method according to claim 1, wherein the first touch screen keyboard and the second touch screen keyboard are separate keyboards.

* * * * *